United States Patent [19]

Van Unen et al.

[11] Patent Number: 4,948,544
[45] Date of Patent: Aug. 14, 1990

[54] PROCESS FOR THE PRODUCTION OF THIN STRETCHED FILMS FROM POLYOLEFIN OF ULTRAHIGH MOLECULAR WEIGHT

[75] Inventors: Lambert H. T. Van Unen, Heerlen; Pieter B. Pluyter, Sittard; Willibrordus M. G. F. Pontenagel, Onderbanken, all of Netherlands

[73] Assignee: Stamicarbon B.V., Geleen, Netherlands

[21] Appl. No.: 223,973

[22] Filed: Jul. 25, 1988

[30] Foreign Application Priority Data

Jul. 23, 1987 [DE] Fed. Rep. of Germany ....... 3724434

[51] Int. Cl.$^5$ ...................... B29C 55/14; B29C 69/00
[52] U.S. Cl. ................................ 264/204; 264/210.7; 264/235.8; 264/290.2; 264/344; 526/348.1
[58] Field of Search .................... 264/204, 205, 210.7, 264/235.8, 290.2, 344; 526/348.1, 352

[56] References Cited

U.S. PATENT DOCUMENTS

| | | | |
|---|---|---|---|
| 3,996,171 | 12/1976 | Holland et al. | |
| 4,413,110 | 11/1983 | Kavesh et al. | 526/348.1 |
| 4,551,296 | 11/1985 | Kavesh et al. | 264/204 X |
| 4,600,633 | 7/1986 | Kono et al. | 264/204 X |
| 4,625,372 | 12/1989 | Hufnagel et al. | 264/290.2 |
| 4,663,101 | 5/1987 | Kavesh et al. | 264/204 X |

FOREIGN PATENT DOCUMENTS

| | | | |
|---|---|---|---|
| 163424 | 12/1985 | European Pat. Off. | |
| 301621 | 2/1989 | European Pat. Off. | |
| 62-257414 | 11/1987 | Japan | 264/210.7 |
| WO86/02282 | 4/1986 | PCT Int'l Appl. | |
| WO86/02656 | 5/1986 | PCT Int'l Appl. | |
| 2164897 | 4/1986 | United Kingdom | 264/204 |
| 2164898 | 4/1986 | United Kingdom | |

*Primary Examiner*—Jeffery Thurlow
*Assistant Examiner*—Leo B. Tentoni
*Attorney, Agent, or Firm*—Cushman, Darby & Cushman; Cushman, Darby & Cushman

[57] ABSTRACT

A process is disclosed for producting thin stretched films having a thickness between 0.1 and 20 μm from polyolefins of ultrahigh molecular weight by dissolving the polyolefin in a solvent, shaping the solution at a temperature above the solution temperature of the polyolefin to a tape, cooling the tape to a temperature below the solution temperature to obtain gelation and stretching the gelled tape. In this process the gelled tape is initially subjected to a preliminary orientation in one direction, under solvent removal, and is then stretched in a direction essentially perpendicular to the direction of preliminary orientation, at elevated temperature, followed by final stretching to obtain the finished thin films. This process makes possible the production of films which are free from pores, that is to say transparent and which posses high Young's moduli, high tensile strengths and favorable values for elongation at break.

16 Claims, No Drawings

PROCESS FOR THE PRODUCTION OF THIN STRETCHED FILMS FROM POLYOLEFIN OF ULTRAHIGH MOLECULAR WEIGHT

FIELD OF THE INVENTION

The invention relates to a process for the production of thin stretched films from polyolefins of ultrahigh molecular weight, which possess high tensile strengths, high Young's moduli and excellent values for elongation at break.

BACKGROUND OF THE INVENTION

In EP-A-0,163,424 thin films made from polyethylene of ultrahigh molecular weight and a process for their production are described. This process consists of dissolving polyethylene of ultrahigh molecular weight in a solvent, shaping the solution into a tape, cooling the tape to a temperature below the gelation temperature, a gelled tape being formed, partly removing the solvent from the gelled tape, the gelled tape being fixed in the longitudinal and transverse directions, heating the gelled tape and stretching biaxially in the usual manner.

Since the thin films obtained in this manner exhibit pores and therefore are cloudy, they are subjected to a compression process at a temperature below the melting point of the polyethylene, a press or calendar being used.

This compression treatment is not able however to remove all pores and represents a measure which makes a continuous production of film on an

SUMMARY AND OBJECTS OF THE INVENTION

An object of the present invention is to overcome the disadvantages of heretofore known processes. The present invention accomplishes this task by providing a process for producing thin stretched films from polyolefins in the implementation of which the aforesaid compression stage is eliminated, whereby the films obtained are essentially free from pores and hence transparent. Compared with the previously known films, the thin films so produced have improved tensile strengths, Young's moduli and elongation at break values.

DESCRIPTION OF THE INVENTION

The process of the invention for producing thin stretched films from polyolefins of ultrahigh molecular weight comprises dissolving the polyolefin in a solvent, shaping the solution into a tape at a temperature above the solution temperature of the polyolefin, cooling the tape to a temperature below the solution temperature to achieve gelation and stretching the gelled tape wherein the gelled tape is first subjected to a preliminary orientation in one direction under solvent removal, and then is stretched in a direction essentially perpendicular to the direction of preliminary orientation, at elevated temperature, which is succeeded by a final stretching.

By means of this process it is surprisingly possible to produce stretched thin polyolefin films which are free from pores. Apart from this, the films produced by the process according to the invention possess higher tensile strengths of more than 0.5 GPa, higher Young's moduli of more than 5 GPa and better values for elongation at break of less than 60% compared with the known films. For final thickness of 0.1 to 20 $\mu$m their thickness distribution amounts to less than 10%. Moreover, they are completely transparent, that is to say macroscopically non-porous.

The invention is based on the surprising observation that by a preliminary orientation of the gelled tape in one direction, with solvent removal, and subsequent stretching at an elevated temperature in a direction which is essentially perpendicular to the direction of preliminary orientation, the formation of pores caused by the elimination of solvent from the gelled tape is suppressed and better physical properties of the finished stretched films are achieved than in the case of the known films.

This preliminary orientation can be carried out in such a way that the gelled tape during solvent removal, for example by evaporation, is allowed to shrink more in one direction than in the direction essentially perpendicular thereto, whereby a preliminary orientation of the polyolefin molecules occurs in the direction in which it is allowed to shrink less.

Another possibility consists in carrying out the preliminary orientation in such a way that the gelled tape is stretched more in one direction than in the direction essentially perpendicular thereto in order to achieve the preliminary orientation in one direction.

A third possibility consists in stretching the gelled tape only in one direction. Combinations of these three preferred measures can also be applied to carry out the preliminary orientation of the gelled tape in one direction.

Expediently, the preliminary orientation of the gelled tape is carried out in the machine direction in which case in a continuous procedure, which the present invention allows, the gelled tape is stretched by suitably arranged stretching rolls in the machine direction, a stretching of lesser magnitude than in the machine direction also being carried out, if desired, by clamps which grip the sides of the tape.

In an expedient manner, the preliminary orientation of the gelled tape is carried out in one direction with a stretch ratio of 1.1 to 20, in particular 1.1 to 5.

The solvent removal from the gelled tape during the preliminary orientation is preferably achieved by drying, evaporating the solvent, at from room temperature to 50° C. However, other measures for solvent removal are also possible, using more readily volatile solvents for the polyolefin solvent, and it is also possible to remove the solvent mechanically such as, for example, by squeezing.

The stretching of the gelled tape in the direction essentially perpendicular to the direction of preliminary orientation can be achieved preferably at a temperature which lies between 30° C. below the melting point and the melting point of the polyolefins. This stretching is expediently carried out with a minimum stretch ratio of 1.5, while the maximum stretch ratio is preferably 10 to 15.

The speed with which this stretching in the direction essentially perpendicular to the direction of preliminary orientation is carried out is expediently 1% per second to 1,000% per second.

Before the final stretching, stiffened sections are preferably produced at the edges of the gelled tape which allow in particular ultrahigh final stretching without formation of noticeable curls caused by the locally gripping pulling clamps of the stretching apparatus. These stiffened sections can be produced in a manner whereby the gelled tape, if it is free from solvent, is heated at its lateral edges to a temperature which lies between 10° C.

below the crystalline melting point and below the decomposition temperature of the polymer or, if the gel tape still contains solvent, it is heated to a temperature above the solution temperature and below the decomposition temperature of the polymer (compare also U.S. application of Pluyter et al. Ser. No. 07/223,594, docket 1994, filed on same day as the present application is still pending).

The final stretching can be carried out in one direction, but preferably biaxially, the stretching in this case being able to be carried out simultaneously or sequentially and stretch ratios between 3 and 25 expediently being maintained.

It has further proved expedient to subject the film produced, after the final stretching, to an annealing treatment, which preferably is carried out at a temperature between room temperature and the melting point of the polyolefin. By this annealing process a possible delamination of the films, which can be observed in all highly stretched polyolefin films, is inhibited.

The polyolefin films produced by the process according to the invention are used in particular as magnetic recording media, as capacitor foils, as wire coatings, as components of composite materials, as insulation films, as implantation materials etc.

The polyolefins used to carry out the process according to the invention are preferably polyethylenes, in particular linear polyethylenes, which can contain relatively small quantities, preferably at most 5 mol %, of one or more other alkenes which are copolymerizable therewith, such as, for example, propylene, butylene, pentene, hexene, 4-methylpentene, octene, etc. Preferably the polyethylene contains 1 to 10, in particular 2 to 6, methyl or ethyl groups per 1000 carbon atoms. The process can however be carried out with the use of other polyolefins such as propylene homo- and copolymers. Furthermore, the polyolefins used can also contain small amounts of one or more other polymers, in particular alkene-1 polymers.

The polyolefins used to carry out the process according to the invention possess an ultrahigh molecular weight, that is to say a weight-average molecular weight of at least $4 \times 10^5$ g/mol, it being possible to use polyolefins with molecular weights up to $6 \times 10^6$ g/mol and above.

The polyolefins used can contain known additives such as fillers, stabilizers against degradation by ultraviolet radiation or ozone, flame inhibitors, crystallizing agents, calcium stearate, agents to improve abrasion resistance, antiblocking agents, etc.

Suitable solvents for the ultrahigh molecular polyolefins used to carry out the process according to the invention are the halogenated and non-halogenated hydrocarbons known for this purpose, in particular aliphatic, cycloaliphatic and aromatic hydrocarbons with boiling points of at least 100° C., such as paraffins, toluene, xylenes, tetralin, decalin, $C_9$ to $C_{12}$ alkanes or petroleum fractions. It is also possible to use solvents which are solid at room temperature but which are liquid at the solution temperature, such as paraffin waxes. The polyolefin is dissolved in these hydrocarbons expediently in quantities between 1 and 80% by weight, in particular 10 and 50% by weight. Preferably the solution occurs at a temperature between 100° and 220° C., decalin being used as the particularly preferred solvent. The solution temperature depends of course on the particular polyolefin used, the solvent used, the quantity to be dissolved and the apparatus used to carry out the dissolving. Expediently the dissolving occurs in an extruder, in particular in a twin screw extruder, to which a suspension of the polyolefin to be dissolved in the particular solvent is introduced, one or more static mixers preferably being connected downstream of the extruder. The residence time in the extruder lies expediently between 1 and 25 minutes, in particular between 3 and 15 minutes. With the aid of the kneading action in the extruder and in the static mixers optionally connected downstream, the polyolefin goes into solution. The solution is extruded through a shaping die, which preferably has a width between 60 mm and 700 mm and a height between 100 μm and 10 mm producing a tape which is rapidly cooled to a temperature below the solution temperature of the polyolefin, with formation of a gel. The cooling can be carried out by immersion in a cooling bath, by blowing with a cooling gas or by using cooling rolls. When a cooling bath is used, water is preferably used as the cooling medium but the solvent which was used to dissolve the polyolefin can also be used as the cooling medium. Preferably, the temperature of the cooling bath is between 5° and 40° C.

The gelled tape obtained is then subjected to a preliminary orientation in one direction, preferably in the machine direction, with solvent removal, in the manner described above, it being possible to remove 20 to 100% of the solvent from the gelled tape during this preliminary orientation. After the preliminary orientation in one direction, as the first measure essential to the invention, there follows the second measure essential to the invention of stretching in a direction which is essentially perpendicular to the direction of preliminary orientation, at an elevated temperature, which expediently lies between the melting point of the particular polyolefin and 30° C. below this melting point.

The lateral edges of the gelled tape on which the pulling clamps of the stretching apparatus engage, are then expediently subjected to a stiffening treatment, preferably by heating to a temperature which, if the gelled tape is free of solvent, lies between 10° C. below the crystalline melting point and below the decomposition temperature of the polyolefin, and if the gelled tape still contains solvent, lies above the solution temperature and below the decomposition temperature of the polyolefin. By this heating, a re-renewed entangling of the polymer molecules and hence a stiffening of the lateral edges occurs, so that final stretching with ultra-high stretch ratios is possible, without significant formation of curls, which may tear, at the gripping points of the pulling clamps. The stiffened sections can also be produced by application of a strengthening layer, for example made from a polymer such as a polyethylene of low density (LLDPE). More precise details of this stiffening treatment are obtainable from U.S. application of Pluyter et al., Ser. No. 07/223,594, docket 1994, filed on the same day as the present application still pending, the disclosure of which is hereby incorporated of by reference.

The tape treated in this way is then, in order to obtain the finished thin films with final thicknesses between 0.1 and 20 μm, subjected to final stretching which is carried out monoaxially, but preferably biaxially, it being possible for the biaxial stretching to be carried out in the particular directions sequentially or simultaneously.

The annealing of the finished films in order to suppress a possible tendency to delamination in the plane of the film can be carried out stretching or, in the case of stretching being carried out in accordance with EPO application Docket 5554, the disclosure of which is hereby incorporated by reference. The disclosed process for producing ultra stretched polymer films comprises dissolving a polymer in a solvent, melting a polymer or swelling a polymer in a solvent and deforming same to give a tape and simultaneous or sequential biaxial ultra stretching of the tape to give a thin polymer film. When the biaxial stretching is simultaneously performed in the process, the film is heat-treated after this stretching or, when the stretching is sequentially performed in the process, the film is heat-treated after stretching in one direction and then after stretching in the directions perpendicular thereto or only after both stretchings. The heat treatment in this process is preferably carried out at a temperature between the relaxation temperature and the crystalline melting point of the polymer and especially at a temperature which is between the relaxation temperature and a value defined by this formula:

$$\frac{1 \times \text{relax. temp.} + 3 \times \text{cryst. mp.}}{4}$$

Preferably, the heat treatment is carried out for a period of 5 second to 40 minutes and especially for a period of 10 seconds to 30 minutes. With biaxial stretching, the heat treatment is preferably conducted after stretching, whereas, in the case of sequential biaxial stretching, the heat treatment is expediently performed after stretching in one direction and then after stretching in the direction perpendicular thereto or only after the sequential stretching in both directions. Preferably, the stretching is conducted at a rate of 1% to 1000%.

In the above-process of EPA-301621, filed on July 7, 1988 and published on Feb. 1, 1989, priority date July 23, 1987, EPO Dkt. 5554, for making ultrastretched films, for example, of polyethylene films a tape is formed first from a melt of the polyethylene or from a finely divided polyethylene swollen in a solvent or, with particular preference, from a solution of a polyolefin in a suitable solvent. The solvents used here for dissolving polyethylenes of ultra high molecular weight are known halogenated and non-halogenated hydrocarbons, in particular aliphatic, cycloaliphatic and aromatic hydrocarbons having boiling points of at least 100° C., such as paraffins, toluene, xylenes, tetralin, decalin, $C_9$-$C_{12}$-alkanes or petroleum fractions. It is also possible, however, to use solvents which are solid at room temperature but are liquid at the dissolution temperature, such as paraffin waxes. The polyolefin is advantageously dissolved in these hydrocarbons in quantities of between 1 and 80% by weight, especially between 10 and 50% by weight. Preferably, the dissolution is carried out at a temperature between 160° and 200° C., decalin being employed as a particularly preferred solvent. The dissolution temperature depends of course on the particular olefin used, on the solvents used, on the quantity to be dissolved and on the equipment used for the dissolution. In an expedient manner, the dissolution is carried out in an extruder, in particular in a twin-screw extruder which is fed with a suspension of the polyolefin, which is to be dissolved, in the particular solvent, one or more statix mixers preferably also being arranged downstream of the extruder. The residence time in the extruder is advantageously between 1 and 25 minutes, in particular between 3 and 15 minutes. Assisted by the kneading action in the extruder and in the static mixers which may have been arranged downstream, the polyolefin dissolves. The solution is then expediently extruded through a shaping die which preferably has a width of between 60 mm and 700 mm and a height between 100 μm and 10 mm, a tape being formed which is rapidly cooled to a temperature below the dissolution temperature of the polyolefin, a gel being formed. The cooling can be effected by introducing the tape into a cooling bath, by blowing with a cooling gas or by the use of cooling rolls. When a cooling bath is used, the coolant is preferably water, but the coolant used can also be the solvent employed for dissolving the polymer or an agent which extracts the solvent. Preferably, the temperature of the cooling bath is 5° to 30° C. The gel tape obtained is then biaxially stretched either simultaneously or sequentially with removal of the solvent, the heat treatment being carried out, in the case of simultaneous biaxial stretching after the latter. In the case of biaxial stretching carried out sequentially, a heat treatment is carried out after the first stretching and then a further heat treatment is carried out after the stretching in the direction perpendicular to the first stretching direction, but in this case the heat treatment can also be carried out after the two stretchings. In the case of polyethylene of ultra high molecular weight, the heat treatment is preferably carried out at a temperature between 90° and 135° C. and in particular 90° and 115° C. During the heat treatment, the polyethylene film should be solvent-free as far as possible, whereas the gel tape can still contain solvent during the ultrastretching which is carried out especially at a rate of 10 to 20% per second. The heat treatment can be carried out in the relaxed state of the polyethylene film, but it can also be carried out while the film is held in the machine direction and/or in the transverse direction under tension in a tenter frame, which tension depends on the heat treatment temperature and time, on the film thickness and on the type of production and stretching of the film. During the drying of the gel tapes, the latter can be allowed to shrink to a limited extent in one or both directions, for example by 1 to 30% and preferably 5 to 15%.

The continuous process according to the invention can be carried out with the employment of known apparatus for the production of polyethylene films by the gel process. These apparatus must merely be modified by a heating facility, for example a heating chamber, in which at elevated temperature the stretching of the gelled tape which has been preliminary orientated in one direction is carried out in a direction essentially perpendicular thereto.

The examples which follow illustrate the invention.

EXAMPLE 1

This example describes a discontinuous manner of operating the process according to the invention.

A linear polyethylene with an average molecular weight of $1.5 \times 10^6$ g/mol (Hostalen GUR 412 ®) is dissolved in a concentration of 15% by weight in decalin in a twin screw extruder at a temperature of 190° C. and with a residence time in the extruder of 8 minutes, and extruded through a shaping die with an orifice of 250×4 mm. The tape obtained is cooled in water at a temperature of 15° C., whereupon a piece with dimensions of 200×200 mm is cut from the tape. This piece is tensioned in an elastic tensioning apparatus, this tensioning apparatus allowing a shrinkage at a temperature of 50° C. in an oven of 10% in the machine direction and 35% in the transverse direction.

The gelled tape obtained after receiving the preliminary orientation in the machine direction is then stretched at a speed of 10% per second in the transverse direction for 3 seconds at a temperature of 130° C. followed by a simultaneous biaxial stretching with a stretch ratio of 8×8. Then the film obtained is annealed at 100° C. for 5 minutes under tension.

The film obtained possesses a Young's modulus of 8.5 GPa, a tensile strength of 0.8 GPa, an elongation at break of 23% (in each case measured according to ASTM D-882 with a distance between the clamps of 100 mm and a clamp speed of 100 mm per minute), and a thickness of 2.7 μm.

EXAMPLE 2

(Comparative example)

A linear polyethylene with an average molecular weight of $1.5 \times 10^6$ g/mol (Hostalen GUR 412 ®) is dissolved in a concentration of 15% by weight in decalin under the conditions described in Example 1 in a twin screw extruder, and the solution is shaped with a shaping die of dimensions 250×5 mm to form a tape which is then quenched in the way described in Example 1. After quenching the gelled tape possesses a width of 220 mm and is led through an oven in which clamps located at the sides allow a shrinkage from 220 to 160 mm. The speed of the tape is 20 cm per minute in the oven and 18.5 cm per minute from the oven because of the shrinkage which has occurred there, which amounts to 5% in the machine direction and 28% in the transverse direction.

The tape obtained after receiving the preliminary orientation in the machine direction is simultaneously stretched in both directions at a speed of 10% per second at a temperature of 130° C. Even before a stretch ratio of 2 is reached the film is split in the lengthwise direction. This example therefore shows the importance of the stretching according to the invention in the direction perpendicular to the direction of preliminary orientation.

EXAMPLE 3

(comparative example)

Example 2 is repeated with the exception that in this case a stretching in a direction perpendicular to the direction of preliminary orientation is carried out at 130° C. with a stretch ratio of 1.3. During the simultaneous stretching in both directions which follows, the film likewise splits in the lengthwise direction because of the fact that the stretch ratio in the direction perpendicular to the direction if preliminary orientation is only 1.3 and hence under the lower limit of 1.5.

EXAMPLE 4

The procedure in Example 2 is repeated, a stretching perpendicular to the direction of preliminary orientation of the gelled tape being carried out at 137° C. with a ratio of 5. After simultaneous stretching in the machine direction and in the transverse direction with a stretch ratio of 6×6 at 130° C. a tape is obtained with a Young's modulus of 6 GPa, a tensile strength of 0.4 GPa, an elongation at break of 51%, and a thickness of 2.4 μm.

EXAMPLE 5

The procedure described in Example 2 is repeated, the stretching perpendicular to the direction of preliminary orientation of the gelled tape being carried out at a temperature of 137° C. in a stretch ratio of 8.

Subsequently, sequential stretching is carried out firstly in the machine direction with a stretch ratio of 4 and then in the machine direction with a stretch ratio of 4 and then in the transverse direction with a stretch ratio of 3 at a temperature of 137° C. The tape obtained possesses a Young's modulus in the machine direction of 6.3 GPa (transverse direction 5.5. GPa), a tensile strength in the machine direction of 0.6 GPa (transverse direction 0.6 GPa), an elongation at break in the machine direction of 25% (transverse direction 31%), and a thickness of 4.5 μm.

EXAMPLE 6

A linear polyethylene with a weight-average molecular weight of $1.5 \times 10^6$ g/mol (Hostalen GUR 412 ®) is dissolved in a concentration of 15% by weight in decalin and quenched according to the method described in Example 1. The gelled tape obtained has a width of 220 mm and is led through an oven in which, by means of clamps applied at the sides, a sideways stretching and a shrinkage in the machine direction occur. The speed at which the tape enters the oven is 20 cm per minute and its exit speed from the oven is 13 cm per minute. In the oven the tape is stretched by the laterally placed clamps from its original width of 220 mm to a width of 310 mm. Accordingly, the tape is stretched in the machine direction with a stretch ratio of 0.65 and in the transverse direction with a stretch ratio of 1.4.

This gelled tape, given a preliminary orientation in the transverse direction, is then stretched in the machine direction at a speed of 10% per second at 137° C. with a stretch ratio of 6.5 and then is stretched at 134° C. in the machine direction and in the transverse direction at 10% per second with a stretch ratio of 5×3.

The tape obtained possesses a Young's modulus of 9 GPa, in the transverse direction (machine direction 6 GPa), a tensile strength of 0.7 GPa in the transverse direction (0.7 GPa in the machine direction), an elongation at break of 20% in the transverse direction (28% in the machine direction), and a thickness of 3.4 μm.

EXAMPLE 7

The procedure described in Example 2 is repeated. The tape thus obtained is allowed to shrink in the oven for 20% in the machine direction and 35% in the transverse direction. Subsequently, the gelled tape, given a preliminary orientation, is stretched in the transverse direction with a stretch ratio of 2 and then is stretched at 137° C. in the machine direction and in the transverse direction at a speed of 20 mm per second with a stretch ratio of 8×8. The total stretch ratio of the tape is 66.6.

The tape obtained possesses a Young's modulus in the machine direction of 8.0 GPa (transverse direction 7.5 GPa), a tensile strength in the machine direction of 0.8 GPa (transverse direction 0.7 GPa), an elongation at break in the machine direction of 23% (transverse direction 25%) and a thickness of 4.5 μm.

EXAMPLE 8

(Comparative example)

Example 2 is repeated but the tape is not submitted to a preliminary orientation. The tape is stretched with a stretch ratio in both the transverse direction and the machine direction of 8 at 137° C. The total stretch ratio of the tape is 8×8=64.

The tape obtained possesses a Young's modulus in the machine 30 direction of 4.5 GPa (transverse direction 4.3 GPa), a tensile strength of 0.3 GPa in the machine direction and 0.4 GPa in the transverse direction, an elongation at break of 30% in the machine direction (transverse direction 35%) and a thickness of 6 μm.

We claim:

1. A process for the production of thin stretched films from polyolefins of ultrahigh molecular weight by dissolving the polyolefin in a solvent, shaping the solution into a tape at a temperature above a solution temperature of the polyolefin, cooling the tape to a temperature below the solution temperature to achieve gelation and stretching the gelled tape, wherein the gelled tape is first subjected to a preliminary orientation in one direction under solvent removal, and then is stretched in a direction essentially perpendicular to the direction of preliminary orientation, at elevated temperature, which is succeeded by a final stretching.

2. The process according to claim 1, wherein the preliminary orientation is carried out in such a way that the gelled tape is allowed to shrink more in one direction than in the direction essentially perpendicular thereto.

3. The process according to claim 1, wherein the preliminary orientation is carried out in such a way that the gelled tape is stretched more in one direction than in the direction essentially perpendicular thereto.

4. The process according to claim 1, wherein the preliminary orientation is carried out in such a way that the gelled tape is stretched only in one direction.

5. The process according to claim 1, wherein the preliminary orientation of the gelled tape is carried out in a direction parallel to the machine direction.

6. The process according to claim 1, wherein the preliminary orientation of the gelled tape is carried out in one direction with a stretch ratio in the direction of preliminary orientation of 1.1 to 20.

7. The process according to claim 6, wherein the stretch ratio is 1.1 to 5.

8. Process according to claim 1, wherein the solvent removal from the gelled tape is carried out by drying.

9. The process according to claim 8, wherein the drying is conducted at from about room temperature to about 50° C.

10. Process according to claim 1, wherein the stretching of the gelled tape in the direction essentially perpendicular to the direction of preliminary orientation is carried out at a temperature which lies between the melting point of the polyolefin and 30° C. below this melting point.

11. Process according to claim 1, wherein the stretching of the gelled tape in the direction perpendicular to the direction of the preliminary orientation is carried out with a minimum stretch ratio 1.5.

12. Process according to claim 1, wherein the stretching of the gelled tape in the direction perpendicular to the direction of the preliminary orientation is carried out at a speed of 1% per second to 1000% per second.

13. Process according to claim 1, wherein lateral edges of the gelled tape are treated to produce stiffened sections.

14. Process according to claim 1, wherein the final stretching is carried out in one direction or in both directions simultaneously or sequentially with a stretch ratio between 3 and 25.

15. Process according to claim 1, wherein after the final stretching an annealing treatment of the film obtained is carried out.

16. Process according to claim 15, wherein the annealing treatment is carried out at a temperature from room temperature to the melting point of the polyolefin.

* * * * *

UNITED STATES PATENT AND TRADEMARK OFFICE
CERTIFICATE OF CORRECTION

PATENT NO. : 4,948,544

DATED : August 14, 1990

INVENTOR(S) : Lambert H. T. Van Unen, et al

It is certified that error appears in the above-identified patent and that said Letters Patent is hereby corrected as shown below:

On the title page:

The changes requested are as follows:

In the Title, "POLYOLEFIN" should be --POLYOLEFINS--

Column 3, line 7, "is" should be --,--.

Column 9, line 2, "30" should be deleted.

Signed and Sealed this

Fourteenth Day of January, 1992

Attest:

HARRY F. MANBECK, JR.

*Attesting Officer*  *Commissioner of Patents and Trademarks*